US005752184A

United States Patent [19]

Ishimura

[11] Patent Number: 5,752,184

[45] Date of Patent: May 12, 1998

[54] REMOTE CONTROL SIGNAL RECEIVING CIRCUIT CAPABLE OF PROCESSING A SIGNAL FROM A PLURALITY OF KINDS OF REMOTE CONTROL TRANSMITTER

[75] Inventor: Shizuka Ishimura, Ora-gun, Japan

[73] Assignee: Sanyo Electric Co., Ltd., Osaka, Japan

[21] Appl. No.: 600,830

[22] Filed: Feb. 13, 1996

[30] Foreign Application Priority Data

Feb. 17, 1995 [JP] Japan .................................. 7-029699

[51] Int. Cl.$^6$ .............................. H04B 1/06; H04B 1/18

[52] U.S. Cl. ................ 455/352; 455/151.1; 340/825.69; 340/825.72

[58] Field of Search ............................ 455/151.1, 151.2, 455/151.4, 352, 353; 340/825.24, 825.25, 825.69, 825.72; 341/26, 173, 176

[56] References Cited

U.S. PATENT DOCUMENTS

| | | | |
|---|---|---|---|
| 3,894,176 | 7/1975 | Mellon | 340/274 |
| 4,065,862 | 1/1978 | Meyer | 364/200 |
| 4,771,283 | 9/1988 | Imoto | 340/825.72 |
| 4,817,203 | 3/1989 | Tsurumoto et al. | 359/148 |
| 5,109,420 | 4/1992 | Nonaka | 455/352 |
| 5,453,738 | 9/1995 | Zirkl et al. | 340/825.69 |
| 5,481,252 | 1/1996 | Kwon et al. | 340/825.24 |

*Primary Examiner*—Reinhard J. Eisenzopf
*Assistant Examiner*—Sam Bhattacharya
*Attorney, Agent, or Firm*—Loeb & Loeb LLP

[57] ABSTRACT

A plurality of remote control decoders are provided for decoding an encoded signal from a remote control receiving module, to generate remote control data, the remote control decoders each decoding a signal encoded in a different remote control data format. A key scanning circuit is provided for scanning a key matrix, to fetch key input data. A selection circuit is provided for selecting either the remote control data from the plurality of remote control decoders or key input data from the key scanning circuit. A transmission register is provided to store the selected data. The stored data are serially transmitted in synchronism with a synchronous signal. With this arrangement, a plurality of kinds of remote control transmitter can be used, in addition to the fact that any of the data from the remote control transmitters and the data from the key matrix can be transmitted via a common communication line.

12 Claims, 3 Drawing Sheets

REMOTE CONTROL SIGNAL RECEIVING CIRCUIT CAPABLE OF PROCESSING A SIGNAL FROM A PLURALITY OF KINDS OF REMOTE CONTROL TRANSMITTER

BACKGROUND OF THE INVENTION

1. Field of the Invention

This present invention relates to a remote control signal receiving circuit for receiving an encoded signal from a remote control receiving module to generate remote control data, and for transmitting the remote control data to a controller, such as a microcomputer.

2. Description of the Prior Art

Conventionally, for reception of a remote control signal, as shown in FIG. 1, a remote control receiving module 6 receives the remote control signal from a remote control transmitter 5, whereupon an encoded signal is extracted by removing a carrier wave from the received remote control signal, and then transmitted to the microcomputer 3 via a remote control transmission line 7. The microcomputer 3 serves as a controller for the key matrix circuit 2.

The microcomputer 3 receives the encoded signal transmitted via the transmission line 7 at its interrupt terminal INT, and decodes the encoded signal by pulse discriminating through an interrupt handling procedure.

Such an apparatus capable of receiving a remote control signal often includes a key matrix circuit for manual inputting. One set of LSI constitutes a key input processing circuit 1 for processing a key input from the key matrix circuit, as shown in FIG. 1. The key input processing circuit 1 is directly connected with a key matrix circuit 2, and further connected with a microcomputer 3 via a number of serial communication lines 4, which are provided independent of a remote control communication line 7.

The LSI constituting the key input processing circuit 1 also incorporates a display driver so as to drive a connected display 8 by inputting display data to the LSI 1 from the microcomputer 3 via one of the communication lines 4.

Currently, a plurality of kinds of data format are available for use by a remote-controller, and therefore a plurality of kinds of remote control transmitter responding to the plurality of kinds of data format are in use.

In the conventional circuit structure, however, since an encoded remote control signal is directly transmitted to the microcomputer 3 via the remote control transmission line 7, and decoded by the microcomputer 3 through interrupt handling using software, it is only possible to use a remote control transmitter which corresponds to the software installed in the microcomputer 3, or it is necessary to change the software for the microcomputer 3 so as to correspond to the remote control transmitter to be used.

Moreover, since a communication line 4 for transmitting key input data from the key matrix circuit 2 to the microcomputer 3 and a transmission line for transmitting the encoded signal from a remote-controller to the microcomputer 3 are different, a conventional receiving apparatus which incorporates a key matrix circuit has a problem in that the number of connecting lines between the apparatus and an external microcomputer is inevitably increased.

In particular, in a case of a stereo for use mounted in a vehicle, since the key input processing circuit 1 and the remote control receiving module 6 are mounted on a front panel circuit board, while the microcomputer 3 is mounted on the main circuit board of the stereo, the number of connecters for connecting the connecting lines are also increased, as the number of the connecting lines increases.

Moreover, as it may additionally control a CD player, a CD changer, a logic deck and so forth, as well as carrying out bus communication with external components, the microcomputer 3 is likely to be prevented from executing interrupt handling with respect to a remote control signal which has been input without prior notice, and therefore its function of receiving remote control data is impaired.

SUMMARY OF THE INVENTION

This invention has been conceived to overcome the above problems involved in the prior art. For this purpose, the present invention provides a remote control signal receiving circuit capable of processing remote control signals from a plurality of kinds of remote-controller comprising: a plurality of remote control decoders each for decoding a respective one of a plurality of kinds of encoded signal supplied from a remote control receiving circuit, and for generating a respective one of a plurality of kinds of remote control data; and a transmission register for selectively storing the remote control data from any one of the plurality of remote control decoders, and for transmitting the stored data, wherein preferably the transmission register is a shift register, and outputs the stored data in response to an externally supplied synchronous clock.

The remote control signal receiving circuit of the present invention further comprises a selection circuit for selecting remote control data from any one of the remote control decoders according to externally supplied selection data, wherein the transmission register stores the remote control data selected by the selection circuit. In other words, any one of the plurality of remote control data are selected according to the selection data, and then used to generate remote control data, which are in turn serially transmitted to an external microcomputer via the transmission register. With this arrangement, the microcomputer can respond to any one of a plurality of kinds of remote control data format.

The remote control signal receiving circuit of the present invention still further comprises a key scanning circuit connected to a key matrix circuit, for scanning the key matrix circuit to fetch key input data, wherein the transmission register selectively stores either the remote control data from any one of the plurality of remote control decoders or the key input data from the key scanning circuit. With this arrangement, the remote control data and the key input data can be serially transmitted via a common transmission register, and therefore the microcomputer for receiving the data is able to receive these data via a common supplying interface.

The remote control signal receiving circuit of the present invention still further comprises a receiving register for storing externally supplied selection data, wherein the selection circuit selects remote control data from any one of the plurality of remote control decoders according to the selection data stored in the receiving register. With this arrangement, it is possible to supply selection data from the microcomputer for selection of remote control data according to the selection data.

The remote control signal receiving circuit of the present invention still further comprises a display driving circuit for driving a display according to display data, wherein the display and selection data are externally supplied via a communication line, and the receiving register stores the display and selection data. With this arrangement, it is possible to receive display and selection data via a single communication line used to transmit display data.

According to the present invention, since the receiving circuit can respond to a plurality of kinds of remote control data format, it is possible to use different kinds of remote control transmitters without exchanging software installed in a microcomputer.

Furthermore, since remote control data from a remote-controller and key input data from a key matrix circuit are serially transmitted using a common transmission register, it is possible to simplify the circuit structure, without increasing the number of connecting lines. Moreover, since a microcomputer does not need to execute interrupt handling exclusively for a remote control signal, the microcomputer has a lower processing burden.

DESCRIPTION OF THE PREFERRED EMBODIMENTS

Figure 1:
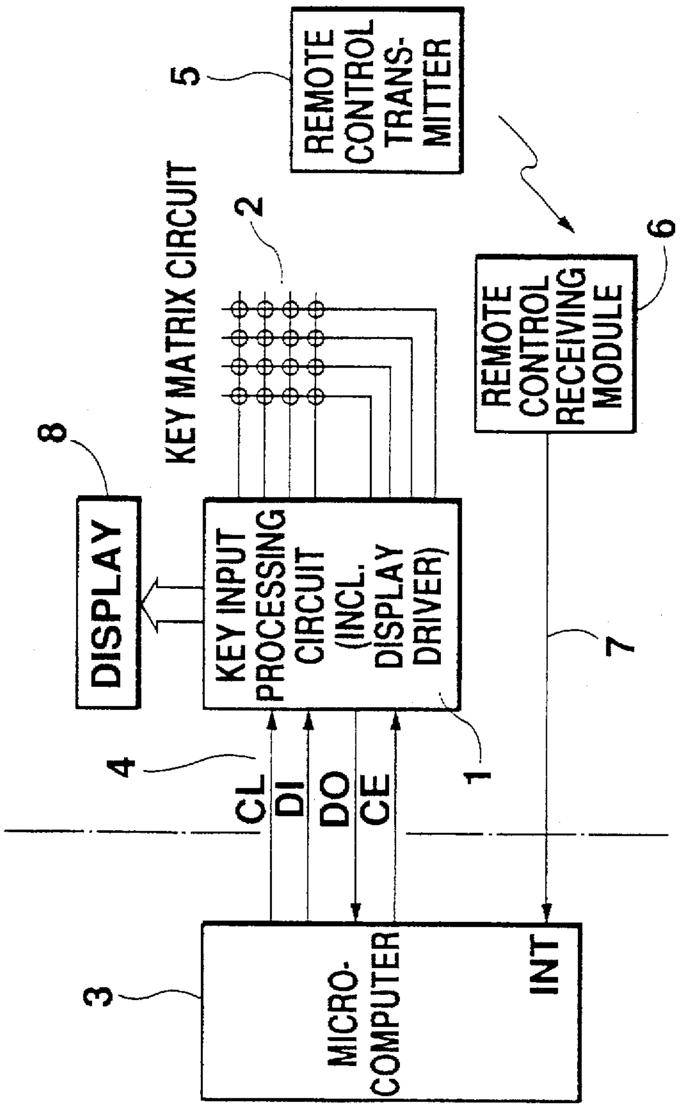
Fig. 1 PRIOR ART
FIG. 1 is a block diagram showing a configuration of a prior art.
Figure 2:
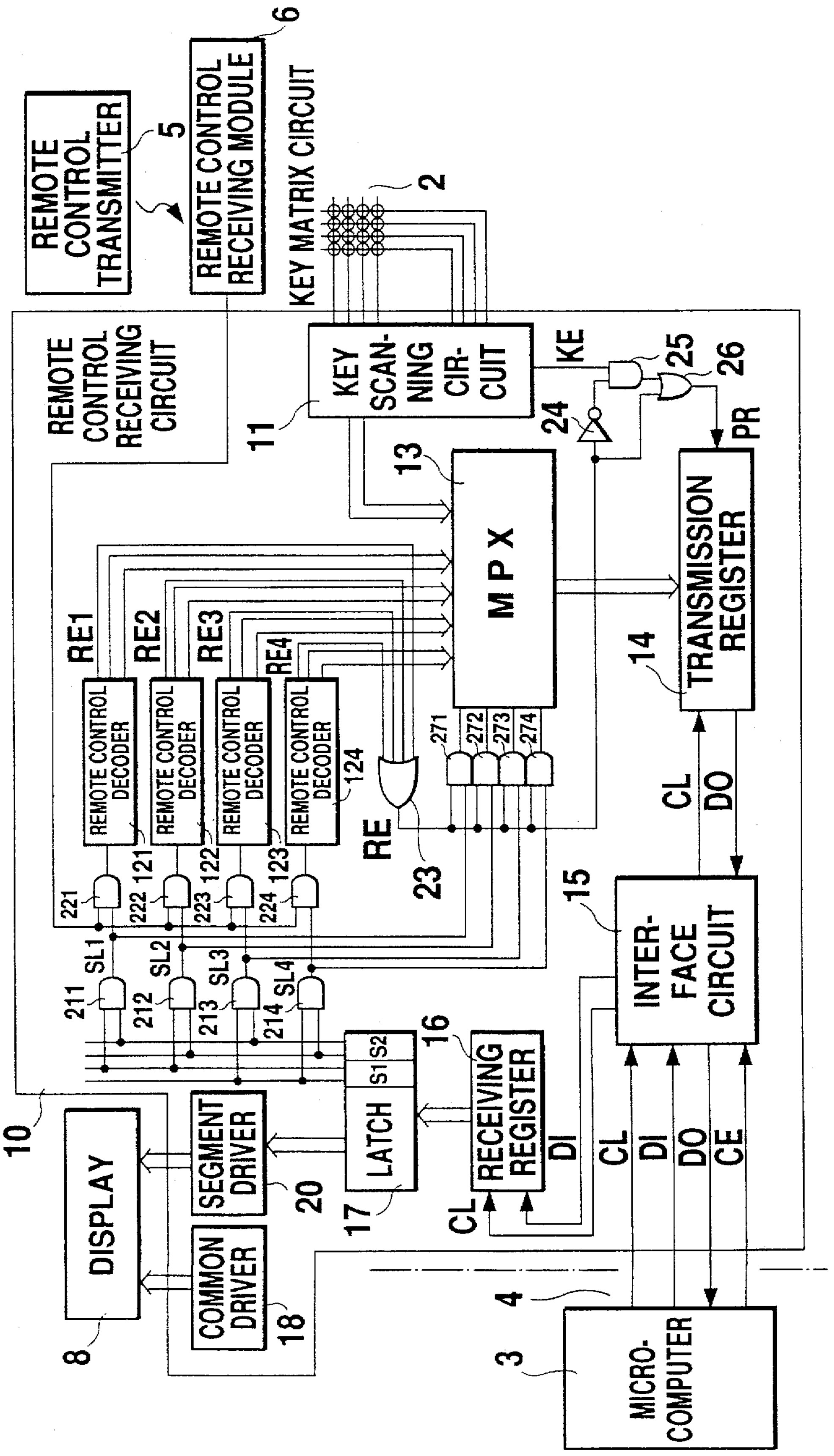
FIG. 2 is a block diagram showing a preferred embodiment of the present invention.

FIG. 2 is a block diagram showing the configuration of a preferred embodiment of the present invention, including one set of LSI 10 constituting a remote control signal receiving circuit including a key input processing circuit. A remote control receiving module 6 for receiving a remote control signal from a remote control transmitter 5, a key matrix circuit 2, and a display 8, such as an LCD panel, are connected to the LSI 10 (that is, the key input processing circuit).

In a case of a stereo for use mounted in a vehicle, the above components are all mounted on a front panel circuit board, while connecting to the microcomputer 3 mounted on the main circuit board of the stereo via only four communication lines 4.

The remote control receiving circuit 10 includes a key scanning circuit 11 for scanning the key matrix circuit 2 to obtain (fetch) key input data corresponding to the pressed key; a plurality of control decoders 121, 122, 123 and 124 each corresponding to a different remote control data format, for decoding an encoded signal extracted by removing a carrier wave from a remote control signal received by the remote control receiving module 6, to generate remote control data; a multiplexer for receiving the key input data from the key scanning circuit 11 and the remote control data from the plurality of remote control decoders 121, 122, 123 and 124, and for selectively outputting either one of the received data; a transmission register for being set with the data selectively output from the multiplexer 13, and for serially transmitting the set data in synchronism with an input clock CL; and an interface circuit 15 for interfacing between the receiving circuit 10 and the microcomputer 3.

The remote control signal receiving circuit 10 further includes a receiving register 16 for receiving selection data S1 and S2 and display data, both transmitted from the microcomputer 3; a latch circuit 17 for latching the content of the receiving register 16; a segment driver 20 and a common driver 18 for driving a display 8 according to the latched display data; AND gates 211, 212, 213 and 214 for decoding the selection data, which have been latched in the latch circuit 17, and for outputting the selection signals SL1, SL2, SL3 and SL4, respectively; and AND gates 221, 222, 223 and 224 for receiving the selection signals SL1, SL2, SL3 and SL4, respectively, at one terminal, and the encoded signal from the remote control receiving module 6 at the other terminal, and for executing an input-switching by supplying the encoded signal to any one of the plurality of remote control decoders 121, 122, 123 and 124.

Upon completion of a decoding operation, the plurality of remote control decoders 121, 122, 123 and 124 respectively generate end signals (completion signals) RE1, RE2, RE3 and RE4, which are applied to an OR gate 23. These signals mean the completion of decoding the encoded signals. Upon completion of fetching the key input data, the key scanning circuit 11 outputs a completion signal KE. The completion signal KE and an output signal RE of the OR gate 23 are supplied to an invertor 24, an AND gate 25 and an OR gate 26. The output of the OR gate 26 is then applied to the transmission register 14 as a pre-set signal PR. Furthermore, AND gates 271, 272, 273 and 274 are also provided in the circuit 10, for respectively receiving the selection signals SL1, SL2, SL3 and SL4 at one terminal, and the output signal RE of the OR gate 23 at the other terminal, and for transmitting an output to the multiplexer 13.

The transmission register 14 and the receiving register 16 are shift registers.

The operation of the preferred embodiment will next be described.

Prior to reception of a remote control signal, the microcomputer 3 transmits selection signals S1 and S2 which correspond to the data format of the remote control transmitter 5 to be used, to the remote control receiving circuit 10 via one of the communication lines 4. The transmission method will be described later.

The selection data S1 and S2 are further transmitted via the interface circuit 15, and received by the receiving register 16 in the remote control signal receiving circuit 10. The content of the selection data S1 and S2 is latched by the latch circuit 17. The latched selection data S1 and S2 and their respective inverse data are respectively supplied to the four AND gates 211, 212, 213 and 214, to respectively form selection signals SL1, SL2, SL3 and SL4.

More concretely speaking, when the selection signals “S1, S2” indicate “0, 0” the selection signal SL1 output from the AND gate 211 becomes an H level, while, in respective cases when the selection signals “S1, S2” indicate “0, 1”, “1, 0” or “1, 1” the selection signal SL2, SL3, or SL4, which are respectively output from AND gates 212, 213 and 214, respectively become an H level.

Figure 3:
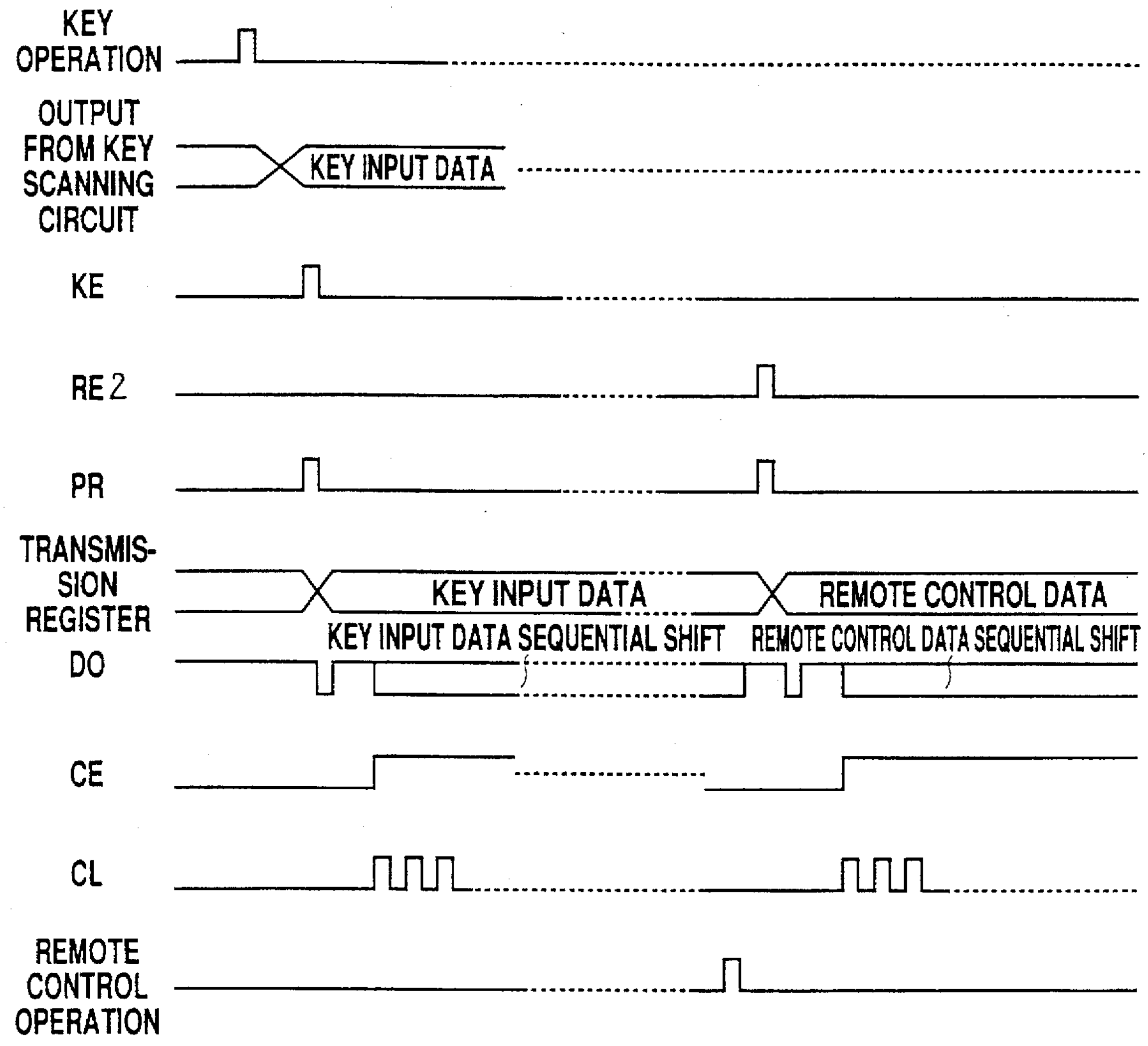
FIG. 3 is a timing chart explaining the operation of the preferred embodiment of the present invention.

Referring to FIG. 3, when the remote control transmitter 5 is operated, a remote control signal, comprising an encoded signal superimposed on a carrier wave, is received by the remote control receiving module 6, whereupon the encoded signal is extracted by removing the carrier wave from the received remote control signal. Although the encoded signal is input to all of the four AND gates 221, 222, 223 and 224, assuming that the latch circuit 17 is latching the selection data indicating “0, 1” the input encoded signal is applied solely to the remote control decoder 122 for the decoding operation, since the selection signal SL2 from AND gate 212 is the sole selection signal being at an H level.

The operation in a case where the remote control decoder 122 is selected will next be described. It is to be noted that the operation in a case where any one of the other decoders 121, 123 and 124 is selected, is the same.

The decoder 122 transmits remote control data to the multiplexer 13, and simultaneously outputs an end signal RE2 indicative of the completion of a decoding operation, which is applied to the AND gates 271, 272, 273 and 274 via the OR gate 23. Since, among the AND gates 271, 272, 273 and 274, the AND gate 272 for receiving SL2 is the sole AND gate which receives a selection signal at an H level, the multiplexer 13 consequently selects an output from the corresponding remote control decoder 122. It is to be noted that when the respective one of the outputs from the AND gates 271, 273 and 274 is at an H level, the multiplexer 13 consequently selects the output from the respective one of the corresponding remote control decoders 121, 123 and 124.

The end signal RE2 is applied as a pre-set signal PR to the transmission register 14 via the OR gates 23 and 26, whereby the remote control data transmitted from the remote control decoder 122 via the multiplexer 13 is set in the transmission register 14.

On the other hand, upon the pressing of any of the keys in the key matrix circuit 2, the key scanning circuit 11 initiates its operation for scanning the key matrix circuit 2 to fetch key input data. Upon completion of fetching the key input data, the key scanning circuit 11 outputs a completion signal KE, which is also applied to the transmission register 14 as a pre-set signal PR via an AND gate 25 and an OR gate 19 when the output from the OR gate 23 is at an L level.

The multiplexer 13 is connected to all outputs from the four AND gates 271–274. Since it is so configurated, the multiplexer 13 normally selects key input data when all connected outputs from the four AND gates 271–274 are at an L level, unless an end signal RE is output. However, when any one of the remote control decoders 121–124 outputs an end signal RE, the multiplexer 13 is switched to select the output from the remote control decoder which has output the end signal RE, prior to the key input data, irrespective of the existence/non-existence of a generation completion signal KE.

In this way, the key input data, which have been generated by the key scanning circuit 11, are selected by the multiplexer 13 and further transmitted to, and set in the transmission register 14.

As described above, any of the data from the scanning circuit 11 and the data from the remote control decoders 121–124, can be selectively set in a common transmission register 14.

Serial transmission of data from the transmission register 14 to the microcomputer 3 will next be described.

Upon acknowledgement of the fact that the transmission register 14 has been set with data in accordance with the signal RE or KE, the interface circuit 15 changes a data out signal DO of a third line of the communication lines 4 from an H level to an L level so as to transmit a request for reading to the microcomputer 3, which is mounted on the main circuit board of the stereo. Upon receipt of the request, the microcomputer 3 sets a chip enable signal CE of a fourth line of the communication lines 4 at an H level and sends it to the interface circuit 15, and then outputs a synchronous clock CL via a first line of the communication lines 4. Subsequently, upon detection of the chip enable signal CE at an H level, the interface circuit 15 applies the synchronous clock CL from the microcomputer 3 to the transmission register 14, whereby the content of the transmission register 14 is sequentially shifted in synchronism with the supplied synchronous clock CL. The latched content of the transmission register 14 is then transmitted to the microcomputer 3 as DO data via the third line of the communication lines 4.

As described above, key input data and remote control data are serially transmitted to the microcomputer 3 via the third line of the communication lines 4, and received by the microcomputer 3 through identical processing. With this arrangement, the microcomputer 3 does not need to execute interrupt handling exclusively for remote control, contrary to the prior art.

For the transmission of selection or display data from the microcomputer 3, the microcomputer 3 sets and transmits the chip enable signal CE at an H level via the fourth line of the communication lines 4, and outputs a synchronous clock CL and display data, as input data DI, via the first and second lines, respectively, of the communication lines 4. Upon detection of the chip enable signal CE at an H level, the interface circuit 15 applies the synchronous CL and display data both from the microcomputer 3 to the receiving register 16, so that the receiving register 16 serially receives the display data in synchronism with the synchronous clock CL. The received display data are then further supplied to the latch circuit 17 for latching. Among the latched data, the selection data S1 and S2 are used to generate selection signals SL1, SL2, SL3 and SL4, while the display data are supplied to a segment driver 20. The segment driver 20 drives a connected display in cooperation with a common driver 18, for displaying according to the display data.

What is claimed is:

1. A remote control signal receiving circuit capable of processing a remote control signal from a remote controller, the remote controller having one of a plurality of data formats that the remote control signal receiving circuit is capable of processing, the remote control signal receiving circuit comprising:

(a) a plurality of remote control decoders for decoding encoded signals based on the plurality of data formats to generate remote control data according to the plurality of data formats, each of the plurality of remote control decoders and each of the encoded signals corresponding to one of the plurality of data formats;

(b) a selection circuit for selecting in advance one of the plurality of remote control decoders corresponding to the data format of the remote controller so that an encoded signal transmitted from the remote controller is supplied to the remote control decoder corresponding to the data format of the remote controller in accordance with selection data, the selection data being supplied by an external source other than the remote controller; and (c) a transmission register for selectively storing remote control data from the remote control decoder selected by the selection circuit and for transmitting the stored data.

2. A remote control signal receiving circuit according to claim 1, wherein the transmission register is a shift register and outputs the stored data, in response to an externally supplied synchronous clock.

3. A remote control signal receiving circuit according to claim 2, further comprising:

a key scanning circuit connected to a key matrix circuit, for scanning the key matrix circuit to generate key input data, wherein the transmission register selectively stores either the remote control data from any one of the plurality of remote control decoders or the key input data from the key scanning circuit.

4. A remote control signal receiving circuit according to claim 3, further comprising:

a multiplexer for receiving the key input data from the key scanning circuit and the remote control data from any one of the plurality of remote control decoders, and for selectively outputting either one of the received data to the transmission register.

5. A remote control signal receiving circuit according to claim 4, wherein the key scanning circuit outputs a first completion signal indicative of completion of a fetching operation with respect to the key input data, any one of the plurality of remote control decoders outputs a second completion signal indicative of completion of a decoding operation with respect to the encoded signal, and the multiplexer switches selection according to either the first or second generation completion signal.

6. A remote control signal receiving circuit according to claim 5, wherein the data from the multiplexer are set in the transmission register according to either the first or second completion signal.

7. A remote control signal receiving circuit according to claim 6, further comprising:

an interface circuit connected to the transmission register, for communicating with an external microcomputer, wherein the synchronous clock output from the external microcomputer is supplied to the transmission register via the interface circuit, and the data output from the transmission register is supplied to the external microcomputer register via the interface circuit.

8. A remote control signal receiving circuit according to claim 1, further comprising:

a receiving register for storing the selection data, wherein the selection circuit selects remote control data from any one of the remote control decoders according to the selection data stored in the receiving register.

9. A remote control signal receiving circuit according to claim 1, wherein the selection data are serially transmitted via a communication line.

10. A remote control signal receiving circuit according to claim 9, further comprising:

a display driving circuit for driving a display according to display data, wherein the display and selection data are externally supplied via the communication line, and the receiving register stores the display and selection data.

11. A remote control signal receiving circuit capable of processing a remote control signal from a remote controller, the remote controller having one of a plurality of data formats that the remote control signal receiving circuit is capable of processing the remote control signal receiving circuit comprising:

(a) a plurality of remote control data generation means for decoding encoded signals based on the plurality of data formats to generate remote control data according to the plurality of data formats, each of the plurality of remote control data generation means and each of the encoded signals corresponding to one of the plurality of data formats;

(b) a selection means for selecting in advance one of the plurality of remote control data generation means corresponding to the data format of the remote controller so that an encoded signal transmitted from the remote controller is supplied to the remote control data generation means corresponding to the data format of the remote controller in accordance with selection data, the selection data being supplied by an external source other than the remote controller; and (c) storing means for selectively storing the remote control data from the remote control data generation means selected by the selection means; and (d) transmission means for transmitting the remote control data stored in the storing means.

12. A method of processing a remote control signal from a remote controller, the remote controller having one of a plurality of data formats that the remote control signal receiving circuit is capable of processing, the method comprising the steps of:

decoding encoded signals based on the plurality of data formats to generate remote control data according to the plurality of data formats by using remote control decoders, each of the plurality of remote control decoders and each of the encoded signals corresponding to one of the plurality of data formats;

selecting in advance one of the plurality of remote control decoders corresponding to the data format of the remote controller so that an encoded signal transmitted from the remote controller is supplied to the remote control decoder corresponding to the data format of the remote controller in accordance with selection data, the selection data being supplied by an external source other than the remote controller;

selectively storing remote control data from the selected remote control decoder; and transmitting the stored data.

* * * * *